United States Patent
Cahuzac et al.

(10) Patent No.: US 8,137,491 B2
(45) Date of Patent: Mar. 20, 2012

(54) COMPOSITE MATERIAL INSERT AND METHOD FOR THE PRODUCTION THEREOF, AND METHOD FOR CREATING A SANDWICH STRUCTURE COMPRISING SAID INSERT

(75) Inventors: Georges Cahuzac, Le Bouscat (FR); Jack Gauthier, Vayres (FR); Eric Chocheyras, Vanves (FR)

(73) Assignee: Astrium SAS, Paris (FR)

( * ) Notice: Subject to any disclaimer, the term of this patent is extended or adjusted under 35 U.S.C. 154(b) by 627 days.

(21) Appl. No.: 11/577,950

(22) PCT Filed: Oct. 21, 2005

(86) PCT No.: PCT/FR2005/050886
§ 371 (c)(1),
(2), (4) Date: Aug. 13, 2009

(87) PCT Pub. No.: WO2006/045976
PCT Pub. Date: May 4, 2006

(65) Prior Publication Data
US 2009/0301644 A1    Dec. 10, 2009

(30) Foreign Application Priority Data

Oct. 27, 2004  (FR) .................................... 04 52462

(51) Int. Cl.
| | |
|---|---|
| B29C 65/00 | (2006.01) |
| B29C 55/28 | (2006.01) |
| B29C 45/00 | (2006.01) |
| B29C 35/00 | (2006.01) |
| B31B 1/60 | (2006.01) |
| B32B 37/00 | (2006.01) |
| B28B 21/36 | (2006.01) |
| B28B 11/08 | (2006.01) |
| A23P 1/00 | (2006.01) |
| B29B 11/06 | (2006.01) |
| A01J 21/00 | (2006.01) |
| A01J 25/12 | (2006.01) |
| A21C 3/00 | (2006.01) |
| A21C 11/00 | (2006.01) |
| A23G 1/20 | (2006.01) |
| A23G 3/02 | (2006.01) |

(52) U.S. Cl. .......... 156/60; 156/285; 156/286; 156/287; 156/382; 156/381; 425/504; 425/546; 425/388; 425/405.1; 264/478; 264/645; 264/510; 264/511; 264/513; 264/328.1; 264/319

(58) Field of Classification Search .................... 156/60, 156/285, 286, 287, 382, 381; 425/504, 546, 425/388, 405.1; 264/478, 645, 510, 511, 264/513, 328.1, 319
See application file for complete search history.

(56) References Cited

U.S. PATENT DOCUMENTS 4,786,541 A  *  11/1988  Nishimura et al. ............ 428/102
5,079,055 A  *   1/1992  Doyle ........................... 428/36.2
(Continued)

FOREIGN PATENT DOCUMENTS
DE    198 34 772 A1    2/2000
(Continued)

Primary Examiner — Khanh P Nguyen
Assistant Examiner — Matthew Hoover
(74) Attorney, Agent, or Firm — Perman & Green, LLP

(57) ABSTRACT

A reinforcement insert includes superposed laps of fiber which are coupled to each other by a coupling fiber which passes through the laps in order to form fiber sections wherein at least certain sections thereof are rectilinear. The fiber sections and laps are immersed in a cured resin. The total density of the fibers that make up the insert ranges from 50% to 60% of the volume of the insert and the fiber sections take up 3%-10% of the volume of the insert. A method for creating a sandwich structure includes at least one such insert.

7 Claims, 2 Drawing Sheets

U.S. PATENT DOCUMENTS 6,450,450 B1 * 9/2002 MacDonald et al. ......... 244/126

FOREIGN PATENT DOCUMENTS

| DE | 203 14 187 U1 | 1/2004 |
| DE | 102 35 509 A1 | 2/2004 |
| EP | 0 903 216 A2 | 3/1999 |
| FR | 01 15315 A1 | 5/2003 |

* cited by examiner

COMPOSITE MATERIAL INSERT AND METHOD FOR THE PRODUCTION THEREOF, AND METHOD FOR CREATING A SANDWICH STRUCTURE COMPRISING SAID INSERT

This application is the National Stage of International Application No. PCT/FR2005/050886, International Filing Date, 21 Oct. 2005, which designated the United States of America, and which international application was published under PCT Article 21(2) as WO Publication No. WO 2006/045976 and which claims priority from French Application No. 04 52462, filed 27 Oct. 2004.

The disclosed embodiments concern an insert of composite material and its manufacturing process. The subject of the disclosed embodiments is also a process for creating a sandwich structure having such an insert.

Sandwich structures of composite materials have exceptional properties, notably mechanical properties. They combine a high resistance to mechanical and/or thermal stresses and a high rigidity with a minimum mass.

These structures are therefore widely implemented in the space industry (satellites, probes, launchers) and in the aeronautics industry (hatches, ports, leading edges, ailerons, interior partitions, etc.).

Numerous processes for manufacturing these composite structures are known, which comprise two outer skins connected by a core. This core does not work very hard [does not bear a lot of stress] and is generally made up of a material of small mass and/or weak mechanical properties. Therefore, either an expanded material of the honeycomb or foam structural type, or simple binding threads are used.

However, the secure fastening of these sandwich structures and on them poses problems. The core and the skins, due to their thinness, have insufficient mechanical properties to support a load concentrated at one point of the sandwich structure such as that occasioned by the fastening means, a screw, for example.

Inserts have therefore been developed to create interfacing for the fastening means and the sandwich structure, thus distributing the local binding forces over a greater volume of the sandwich structure. These inserts are implemented in sandwich structures made of both composite material skins and metal skins.

FIG. 1 shows a particular embodiment of the sandwich structure of the prior art comprising such an insert. Sandwich structure 1 has two skins 2, 3, comprising very strong textile fibers such as carbon fibers and a honeycomb core 4, in which skins 2, 3 are joined to core 4 by polymerization of a resin. A recess is formed by means of a cutting tool in one of skins 2 and over a large depth of the thickness of core 4. A metal insert 5 comprising a body 6 and a flange 7, or a broad head, is placed in this recess so that flange 7 covers the outer surface of skin 2 having the opening. A layer of adhesive can be positioned between flange 7 and the outer surface of skin 2 to assure the tight sealing of sandwich structure 1. This broad head advantageously permits distributing a load over a relatively broad zone of skin 2, 3.

Of course, the recess can pass completely through the structure, an opening being made in each of the skins so that the body of insert 5 passes through the entire thickness of core 4 (FIG. 2).

The standard inserts are made from aluminum, titanium or Invar alloys.

The joining of the insert and the sandwich structure must be of the best possible quality in order to prevent a possible loosening of the insert, which can lead to damage of the sandwich structure, for example, corrosion. However, to create a quality bond, the inserts must undergo proper surface preparation. But in practice, this preparation is difficult to carry out, even for aluminum. This is even more true for titanium, for example, and even more so for stainless steel and Invar.

These materials are relatively dense, which renders them poorly compatible with spacecraft manufacturing imperatives where optimization of mass is a true challenge.

There is also a problem of thermal incompatibility between the insert and the sandwich structure. This problem is particularly sensitive for space applications, where the structures are exposed to extreme temperature changes, resulting from variation in sun exposure of the spacecraft. These temperatures can thus vary from −250° C. to +200° C., for example. Therefore, stresses are created at the bond between the sandwich structure and the insert, which result from differences between the thermal expansion coefficients of the materials. These stresses can lead to a deterioration of this bond.

This problem can also occur during operations of manufacture and assembly of the sandwich structure, where, in fact, it may be required that the insert passes through temperature cycles between 0° C. and 200° C., for example, during hot gluing, so that defects may appear in the bond between the sandwich structure and the insert, and the final product will not attain the expected mechanical properties.

Likewise, inserts of composite materials obtained by layering fibers impregnated with resin are known, for example, carbon fibers and an epoxy resin. These inserts partially solve the problems posed by the constraints of mass, thermal expansion and assembly. However, these inserts only have good properties in the plane of the insert, i.e., in the directions where the fibers are present. Outside of this plane, in the thickness, only the resin is working [bears the stress]. Now, it is well known that resins have very poor mechanical properties. These inserts therefore do not behave satisfactorily with regard to the pulling forces exerted by the fastening means, such as screws, or even solely the forces of the thermal cycles during assembly of the insert and the sandwich structure. Delaminations can appear with wear, or even right from manufacture, which can result in breakage of the part.

In one aspect the disclosed embodiments propose an insert and a manufacturing process for such an insert that are simple in their design and in their operating mode, economic; the insert is lightweight, and permits a distribution of forces at the level of the fastenings without delamination.

This insert is monolithic, i.e., it is made up of superposed layers of fiber directly joined to each other by fibers and embedded in a hardened matrix, without interposition between these layers, for example, of a core of expanded material such as in sandwich structures. This insert can be tooled to the desired dimensions and can advantageously take on any form (rectangular, cylindrical, etc.) suitable for its application. Moreover, this insert can be pierced and threaded to permit assembly by screws or any other fastening element.

Another subject of the invention is a particularly simple process for creating a sandwich structure having such an insert. This process advantageously permits co-firing during the gluing onto the core of at least two skins, on the one hand, and during the gluing of the insert with the sandwich structure, on the other hand, without complex surface treatment of the insert.

For this purpose, the invention relates to a reinforcing insert comprising superposed layers of fiber, said layers being embedded in a hardened resin.

According to the invention, the layers are joined together by a joining fiber crossing through these layers, the joining fiber passing back and forth across the layers to form fiber sections, at least some of these sections being rectilinear, the fiber sections being embedded in the hardened resin, and the total density of fibers constituting the insert is comprised between 50% and 60% of the volume of the insert, and the fiber sections occupy between 3% and 10% of the volume of the insert.

In different embodiments of this insert, the disclosed embodiments also concern the following characteristics, which should be considered alone or according to all their technically possible combinations:

the fiber sections occupy between 3% and 6% of the insert volume, the fiber sections occupy between 4.5% and 5% of the insert volume, the rectilinear sections are oriented along a direction parallel to the normal line relative to said layers.

It should be noted that the person skilled in the art, wishing to resolve the problem posed by distributing forces, starting with a composite material insert, and without adversely affecting this insert during the application of low stresses, would naturally use known techniques, for example the use of graft or sequenced copolymers, in order to improve the bond between the matrix and the carbon fibers, such as taught in U.S. Pat. No. 3,855,174. These techniques, however, do not give completely satisfactory results for very high pulling stresses. In fact, the matrix limits the resistance of these inserts to delamination. The implementation of a composite material insert comprising fibers in the three spatial directions would appear to be a surprising solution for a specialist in composite products. In fact, as will be described below, the manufacture of the insert according to the invention requires, on one hand, a compromise between the amount of fiber contained in the plane of each layer and the amount of fiber inserted outside the plane of each of the layers in order to assure good behavior both in the plane of the insert and in its thickness. Moreover, it requires an impregnation of the layers and sections by the resin before polymerization, leaving most of these sections rectilinear and perpendicular to the layers, so that they can play their role of resistance to pulling.

The invention also concerns a manufacturing process for a reinforced insert according to which:

a) the superposed fiber layers are formed, b) the superposed layers are joined together by stitching without tying off or with tying off and pressing, by means of a joining fiber crossing through these layers so as to form fiber sections, at least some of which are rectilinear, c) the assembly thus obtained is impregnated with a resin, d) the resin is polymerized to form a composite material part, e) this composite material part is removed from the mold.

According to the invention, the total density of the fibers constituting the reinforcing insert is comprised between 50% and 60% of the insert volume and the fiber sections occupy between 3% and 10% of the insert volume, and the impregnation operation of step c) is conducted so as not to compress said assembly thus obtained so that said sections remain rectilinear after polymerization of the resin.

In a preferential embodiment, the impregnation operation of step c) is obtained by execution of the following successive steps:

the assembly is positioned in a flexible sealed container having an opening so as to not compress said assembly, this container is placed in a vacuum oven and this container is heated to an impregnation temperature, the resin is injected in the viscous state into the opening of the container so as to impregnate the assembly.

Advantageously, the composite material part is tooled to the required dimensions to form the insert.

The invention finally concerns a process for creating a sandwich structure with at least one insert, according to which the sandwich structure is manufactured by joining an assembly comprising at least two walls positioned respectively on opposite outer surfaces of a core by polymerization of a glue or a first resin, and a recess is formed in at least the core of this sandwich structure, the recess receiving at least a part of this insert.

According to the invention, said at least one part of the insert is placed in the recess, at least one part of the outer surface of this insert being previously coated with a non-polymerized film of glue or a second resin, then it is joined by polymerization, and the insert is a reinforcing insert such as described previously.

In a preferred embodiment, the assembly comprising at least two walls and a core is joined by gluing, the glue covering at least a part of the outer surface of the insert being then identical to the glue serving for joining this assembly.

Likewise, the second resin covering at least a part of the outer surface of the insert can be identical to the first resin used for joining said assembly.

In different possible embodiments, the invention will be described in more detail in reference to the attached drawings, in which:

FIG. 1 schematically shows a sandwich structure having an insert according to a first embodiment of the prior art, FIG. 2 schematically shows a sandwich structure having an insert according to a second embodiment of the prior art;

Figure 1:
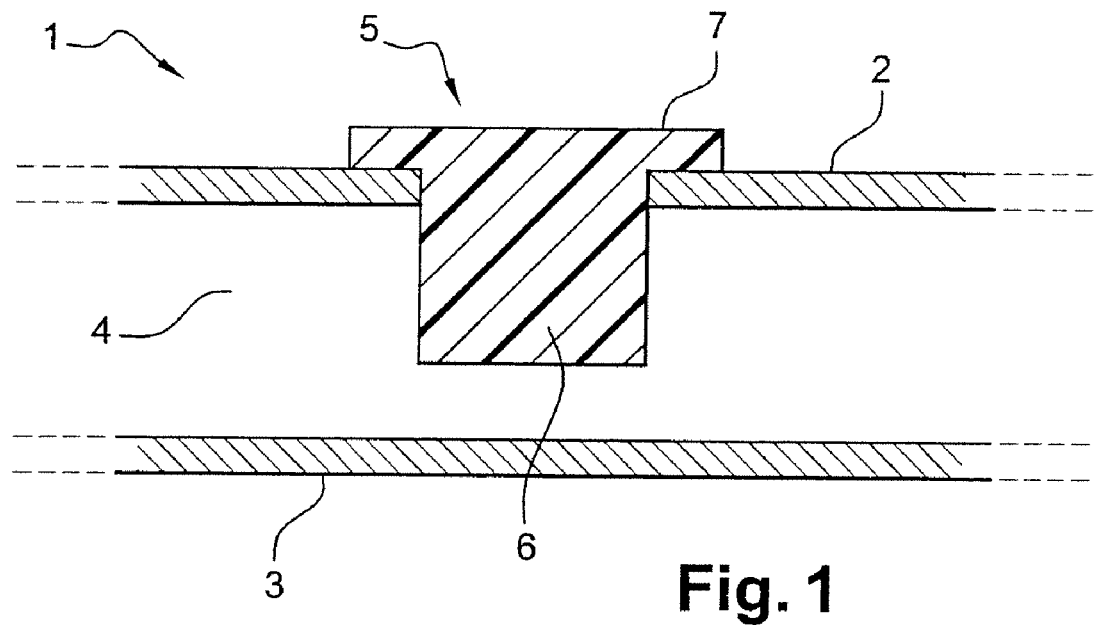
Figure 2:
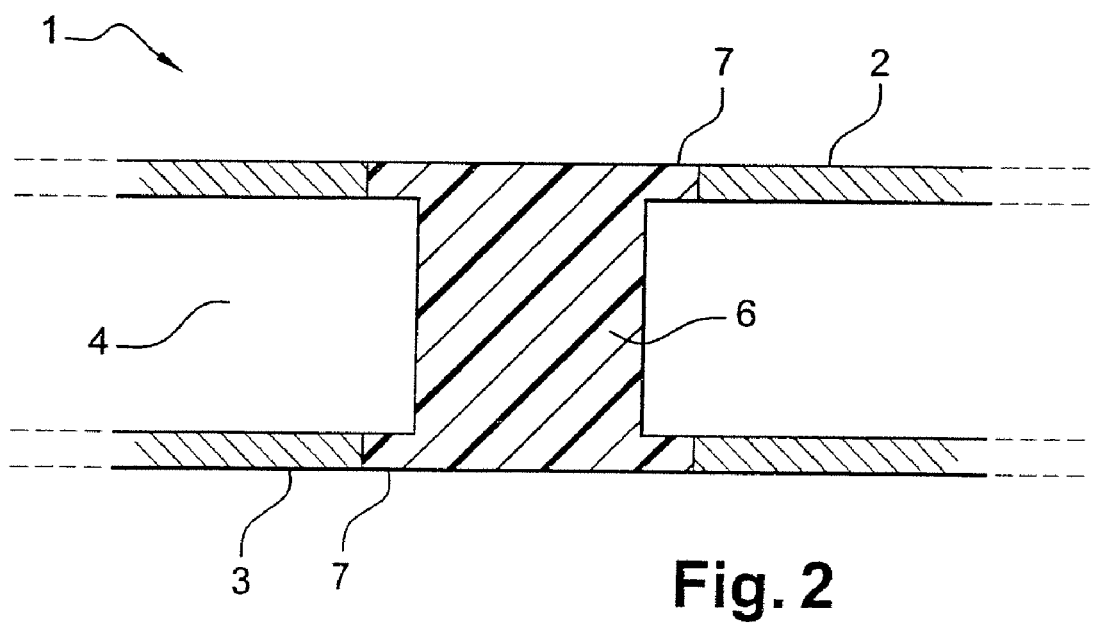
Figure 3:
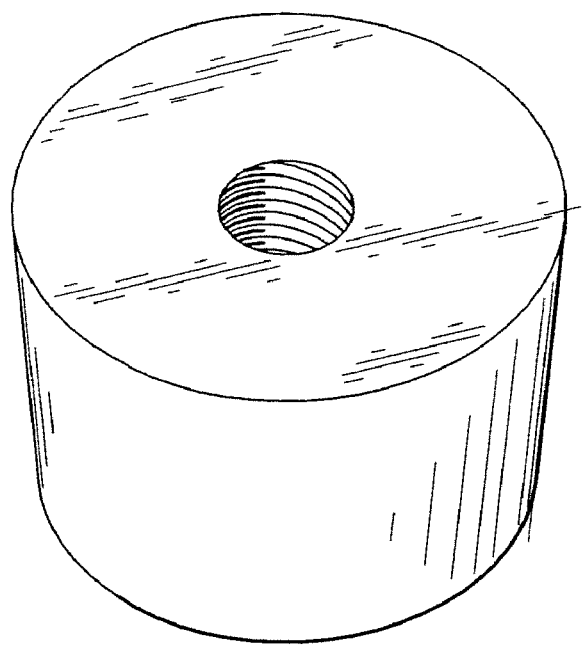
FIG. 3 is a schematic representation of a reinforcing insert of a particular embodiment [of this invention]
Figure 4:
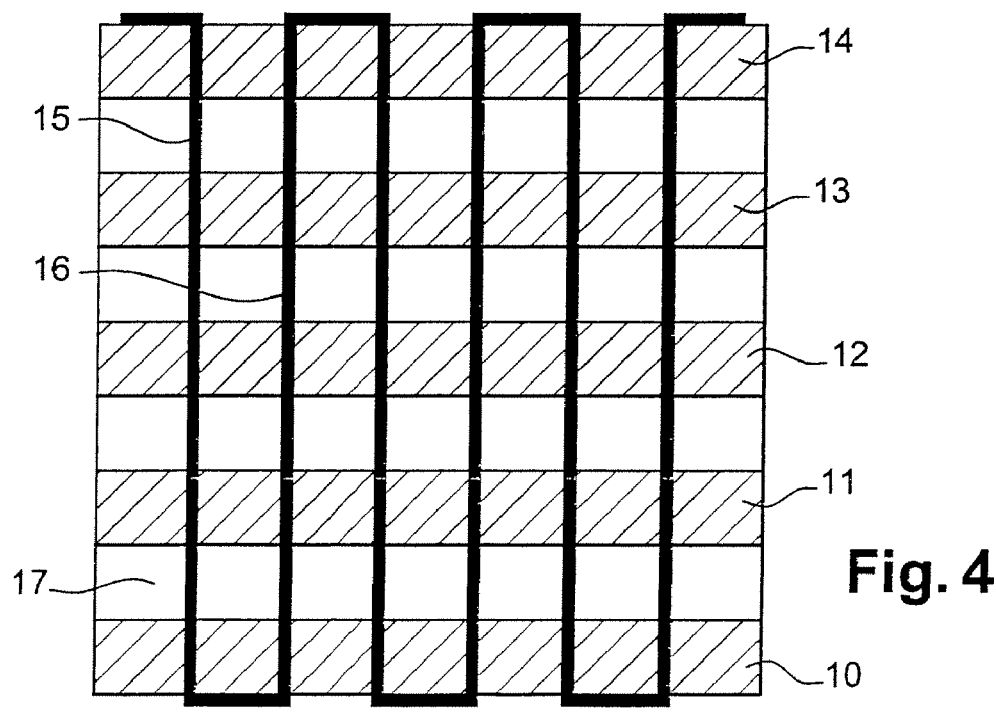
FIG. 4 is a schematic cross section of a reinforcing insert according to a particular embodiment [of this invention].

FIG. 4 shows a reinforcing insert according to a particular embodiment of the invention. This insert comprises superposed fiber layers 10-14 that are joined together by a joining fiber so as to form fiber sections 15, 16. This joining fiber crosses these layers 10-14, for example, by passing back and forth through them to form fiber sections 15, 16. Fiber sections 15, 16 and layers 10-14 are embedded in a hardened resin 17. This resin 17 is advantageously a thermo-hardenable resin of the epoxy resin type, phenolic resin, unsaturated polyesters or another type of resin. At least some of these sections are rectilinear. Preferentially, the impregnation of the layers and sections by the resin is controlled before polymerization so that the assembly of sections 15, 16 is rectilinear. In fact, this involves preventing any compression of the part made up of layers 10-14 joined together by the joining fiber during its positioning in the impregnation mold so that the fiber sections are not compressed. Such a compression, in fact, can lead to a "twisting" of the sections which can thus no longer correctly assure their role of resistance to pulling. In one embodiment, these rectilinear sections 15, 16 are parallel to each other and oriented along an inclined direction relative to the normal line to layers 10-14, which are planar. In another embodiment, these rectilinear sections 15, 16 are oriented along a direction parallel to the normal line relative to the layers.

The fiber sections have the role of reinforcing the resistance to pulling of the insert. However, an introduction of fiber in a direction outside the plane of each layer is not without consequences on the mechanical properties of the latter. In fact, this introduction reduces the amount of fiber of the layers and therefore the mechanical properties of the insert in their plane. The insert therefore must comprise an amount of fibers outside the plane of the layers that is optimal to assure a good resistance to pulling of the insert, without too adversely affecting the properties in the plane of each layer 10-14. Thus, the total density of the fibers constituting the insert is comprised between 50% and 60% of the volume of the insert and fiber sections 15, 16 occupy between 3% and 10% of the volume of the insert. Preferentially, these fiber sections 15, 16 occupy between 3% and 6% of the insert volume, and even more optimally, between 4.5% and 5% of this volume.

The insert must also have a sufficient thickness so that at least one recess can be made in this thickness, which [recess] is suitable for receiving a fastening means such as a screw. This recess is preferably threaded.

The joining fiber and the fibers making up layers 10-14 are fibers of high mechanical strength, or high modulus, for example. They can also be chosen so as to minimize the stresses arising at the wall/insert bond and core/insert bond of the sandwich structure in which it is designed to be positioned, these stresses being linked to the different thermal expansions of these elements.

The joining fiber and the fibers making up the layers can thus be chosen in the group, given by way of non-limiting example, comprising glass fibers, carbon fibers, silica fibers, graphite fibers, quartz fibers, silicon carbide fibers, aramide fibers (for example, Kevlar), PBO (polybenzoxazole) fibers, polyethylene-type fibers, etc.

The layers can be joined together by stitching with or without tying off. The layers are mechanically pressed when they are assembled. In the case of stitching without tying off, the joining thread is held in place by friction.

In patents FR 2,610,951, FR 2,753,993 and FR 2,832,738 of the Applicant, processes and machines are described for creating superposed layers joined together by a joining fiber, of the above type.

In particular, in patent FR 2,832,738, a weaving device is described for creating thick textile armatures made up of superposed layers of threads joined together by a binding thread crossing through said layers, said device comprising a frame provided laterally and at its periphery with regularly distributed hooking pins, means for positioning the thread by means of said pins and means for pressing the layers. The pins are made up of shafts comprising a first section starting at the frame and having a slight incline toward the outside of the frame and a second straight section extending the first section and having an appreciable more accentuated incline toward the outside of the frame. The means for depositing the thread are made up of a plurality of guides, each entraining one thread, and moved simultaneously by being spaced at an interval equal to n times the interval between the pins, n being a prime number. The pressing means for the layers are made up of mechanical means that can press all of said layers on their periphery.

According to one embodiment, the incline of the first pin sections is of the order of a few degrees; however that of the second sections is of the order of 45°.

Such a device permits weaving at a constant height, this height corresponding to the inflection of the pin axis, the thread being positioned at the level of the second section so that by a natural descent of the threads along said second sections, the layer being made becomes stabilized at the level of said inflection; however, the layers formed previously fall back along the first section, due to its incline, to thus provide a place for the new layer.

The invention also concerns a manufacturing process for a reinforcing insert such as previously described. According to this process, superposed fiber layers are formed and these superposed layers are joined together by stitching without tying off or with tying off and pressing, by means of a joining fiber crossing through the layers so as to form fiber sections 15, 16. This joining fiber, for example, can pass back and forth through the layers to form these fiber sections 15, 16. Then an impregnation step of this assembly is carried out with a resin 17, while taking care not to compress the layer/section assembly so that the sections remain rectilinear. In a preferred embodiment, the assembly is placed in a flexible closed container having an opening, so as not to compress this assembly. This container is, for example, a heat-sealed plastic film. This container is placed in a vacuum oven. Advantageously, this assembly is held vertically without constraint in the container by two metal plates outside the container in order to prevent any stress on the fiber layers. Then this container is heated to an impregnation temperature, for example 110° C. The resin, preheated so as to be rendered viscous, is injected so that it suitably wets the fibers of layers 10-14 and sections 15, 16. Said resin 17 is injected in the viscous state through the opening in the container. It is placed in the vacuum oven, typically at a pressure of the order of several hundred millibars. After the air imprisoned under resin 17 has been totally released through this resin and pumped out, atmospheric pressure is re-established so that said resin completely impregnates said assembly. This impregnation phase can last approximately 1 hour in order to obtain a satisfactory impregnation.

Then this resin is polymerized to form a composite material part, for example by raising the temperature to 200° C. for several hours. Finally, this composite material part is removed from the mold and tooled to the required dimensions to form the insert.

The total fiber density constituting the reinforcing insert is comprised between 50% and 60% of the insert volume and fiber sections 15, 16 occupy between 3% and 10% of the volume of the insert. Preferentially, these fiber sections 15, 16 occupy between 3% and 6% of the insert volume, and even better, between 4.5% and 5% of this volume.

This process has the advantage of minimizing the manufacturing costs of the insert by eliminating all the cleaning procedures of a plant used in RTM type ("Resin Transfer Molding") impregnation methods, RFI ("Resin Film Infusion") impregnation methods, etc., which can nevertheless be implemented for creating the insert according to the invention. Since these techniques are well known to the person skilled in the art, they will not be described here.

Finally, the invention concerns a process for creating a sandwich structure with at least one insert, according to which said sandwich structure is manufactured by joining an assembly comprising at least two walls 2, 3 positioned respectively on opposite outer faces of a core 4 by polymerization of a glue or a first resin. Advantageously, in the case of assembly by polymerization of a first resin, this assembly also has at least one film of intumescent material positioned between core 4 and each of said walls 2, 3.

A recess is formed in at least core 4 of said sandwich structure 1 so as to position here at least a part of a reinforcing insert such as is described above. For this, at least a part of the outer surface of this insert is covered beforehand with a non-polymerized glue film or a second resin. This second resin is a film, a powder or a liquid. It can be identical to the first resin. Once the insert is positioned, it can be assembled by firing the insert and sandwich structure 1 together, for example by using an oven.

This recess can be made before joining of said assembly so that said at least one insert is fastened simultaneously with the assembly. Alternatively, it can be fastened after the assembly has been put together.

Preferably, the nature of the insert fibers is chosen so as to minimize stresses appearing at the wall/insert bond and core/insert bond, these stresses being linked to differences in thermal expansion of these elements. Thus the appearance of stress is prevented at the level of the insert/sandwich structure 1 bond, which could lead to defects in manufacture, with the final product not attaining the expected mechanical properties. By way of example, in one implementation of the invention, an insert will be chosen which is based on glass fibers for a sandwich structure with an aluminum skin. If walls 2, 3 are flexible fibrous armatures, fibers identical to the fibers making up these armatures can be chosen for the insert. By way of example and in one mode of implantation, the insert comprises carbon fibers and sandwich structure 1 has carbon skins.

In one particular embodiment, the insert is positioned between walls 2, 3 of the sandwich structure before joining the assembly comprising core 4 and at least two walls 2, 3. For this, first a recess is made in core 4 that can receive this insert, then this insert is covered over at least a part of its outer surface with a second resin or a film of nonpolymerized glue. The insert is placed in the recess and it is polymerized. The recess is adapted to the shape of the insert, which can be cylindrical, rectangular or another shape.

In a variant of this embodiment, the insert comprises a body 6 and a flange or a flat head 7, on at least one of its ends. Prior to putting together the assembly comprising core 4 and at least two walls 2, 3, a recess is made over at least a part of the thickness of core 4 and at least in wall 2, 3 that is designed to receive said flange 7 on its outer surface. At least part of this flange 7 is covered with a second resin or a film of nonpolymerized glue to assure a tight seal of the sandwich structure; the insert is positioned and polymerized.

In the case where the recess is made before joining the assembly of the core/at least two walls, this joining being done by means of injection and polymerization of a first resin in a closed and heated mold, at least a part of the outer surface of the insert being then covered with a glue, the polymerization step is then conducted as follows:

if the polymerization temperature of this glue is lower than the polymerization temperature of the first resin, the glue is polymerized before the injection of this first resin. Then the mold is heated to the polymerization temperature of the first resin and this resin is then injected.

if the polymerization temperature of this glue is equal to the polymerization temperature of said resin, this resin is injected after polymerization of the glue.

The invention claimed is:

1. A process for manufacture of a reinforcing insert comprising:
    forming superposed fiber layers,
    joining together an assembly of said superposed layers by stitching without tying off or with tying off and pressing, by means of a joining fiber crossing through said layers so as to form fiber sections, at least some of said sections being rectilinear,
    impregnating the assembly thus obtained with a resin,
    polymerizing said resin to form a composite material part,
    removing said composite material part from a mold,
    wherein:
    the total fiber density making up the reinforcing insert is comprised of between 50% and 60% of a volume of the reinforcing insert, and fiber sections occupy between 3% and 10% of the volume of the reinforcing insert, and
    the impregnation operation is conducted so as not to compress said assembly thus obtained so that said sections remain rectilinear.

2. The process according to claim 1, further comprising that the impregnation operation is conducted by executing the following successive steps:
    said assembly is positioned in a flexible closed container having an opening,
    this container is placed in a vacuum oven and the container is heated to an impregnation temperature,
    said resin is injected in the viscous state into the container opening to impregnate said assembly.

3. The process according to claim 2, further comprising that said assembly is held vertically without stress in said container by two metal plates.

4. The process according to claim 2, further comprising that said oven is placed under vacuum after injection of said resin, and in that atmospheric pressure is re-established once the air is evacuated from the container so that said resin completely impregnates said assembly.

5. The process according to claim 2, further comprising that said container is a heat-sealed plastic film.

6. The process according to claim 1, further comprising that fiber sections occupy between 3% and 6% of the insert volume.

7. The process according to claim 6, further comprising that fiber sections occupy between 4.5% and 5% of the insert volume.

* * * * *